United States Patent [19]

Watkins et al.

[11] Patent Number: 5,608,482
[45] Date of Patent: Mar. 4, 1997

[54] FILM LOADING METHOD AND RELATED APPARATUS

[75] Inventors: Joseph A. Watkins, Rochester; David C. Smart, Fairport, both of N.Y.

[73] Assignee: Eastman Kodak Company, Rochester, N.Y.

[21] Appl. No.: 638,963

[22] Filed: Apr. 24, 1996

[51] Int. Cl.$^6$ ........................................ G03B 1/00
[52] U.S. Cl. ................................. 396/6; 396/439
[58] Field of Search ..................... 354/202, 203, 354/212, 288; 206/316.1, 316.2, 389, 397, 408

[56] References Cited

U.S. PATENT DOCUMENTS

| | | | |
|---|---|---|---|
| 3,528,356 | 9/1970 | Eagle | 352/222 |
| 3,690,451 | 9/1972 | Nerwin | 206/52 F |
| 3,742,586 | 7/1973 | Butler et al. | 29/430 |
| 3,802,639 | 4/1974 | Dowd, Jr. | 242/81 |
| 3,921,278 | 11/1975 | Basu | 29/427 |
| 4,228,579 | 10/1980 | Dunkel et al. | 29/430 |
| 4,445,768 | 5/1984 | Gold | 354/275 |
| 4,744,527 | 5/1988 | Coote et al. | 242/71.1 |
| 4,756,418 | 7/1988 | Johanson et al. | 206/397 |
| 4,833,495 | 5/1989 | Ohmura et al. | 354/212 |
| 4,884,087 | 11/1989 | Mochida et al. | 354/75 |
| 4,954,857 | 9/1990 | Mochida et al. | 354/75 |
| 4,972,649 | 11/1990 | Mochida et al. | 53/430 |
| 5,031,852 | 7/1991 | Dowling et al. | 242/71.1 |
| 5,193,759 | 3/1993 | Bigelow et al. | 242/71.1 |
| 5,249,753 | 10/1993 | Takahashi et al. | 242/71.1 |
| 5,257,750 | 11/1993 | Wolf et al. | 242/71.1 |
| 5,270,760 | 12/1993 | Zander et al. | 354/275 |
| 5,314,134 | 5/1994 | Harris et al. | 242/71.1 |
| 5,332,169 | 7/1994 | Harris et al. | 242/611 |
| 5,337,968 | 8/1994 | De Bin et al. | 242/521 |
| 5,347,334 | 9/1994 | Smart et al. | 354/275 |

Primary Examiner—Safet Metjahic
Assistant Examiner—J. K. Han
Attorney, Agent, or Firm—Peter J. Bilinski

[57] ABSTRACT

An apparatus for assembling a prewind type camera having a film roll cheer with an open portion for containing an unexposed roll of film. According to the invention, a vacuum is applied to the interior of the film roll cheer at the time the prewound film roll is loaded into the film roll cheer through the open portion to maintain the film roll in a wound state after the roll is released. The vacuum remains applied until a lighttight cover is fixedly attached to the open portion of the film roll chamber thereby restraining the film roll.

7 Claims, 6 Drawing Sheets

5,608,482

FILM LOADING METHOD AND RELATED APPARATUS

CROSS REFERENCE TO RELATED APPLICATION

Reference is made to and priority claimed from U.S. Provisional application Ser. No. US 60/005,131, filed 12 Oct. 1995, entitled FILM LOADING METHOD AND RELATED APPARATUS.

FIELD OF THE INVENTION

The invention relates generally to the field of photography, and in particular to the assembly of cameras. More specifically, the invention relates to a method of maintaining the tension of a wound filmstrip roll during the assembly of a prewind camera.

BACKGROUND OF THE INVENTION

In prewind-type cameras, a prewound filmstrip roll contained in a film supply chamber of a lighttight camera body is advanced in a frame-by-frame manner into a film cartridge separately contained in an adjacent chamber of the camera body. After all of the exposures of the filmstrip roll have been taken, the film cartridge can be removed from the camera body for processing without requiring a separate film rewind, required in conventional wind cameras. Examples of prewind cameras include the so-called single-use cameras manufactured by Eastman Kodak Company and Fuji Photo Film Co., Ltd., such as those described in U.S. Pat. Nos. 4,884,087, 4,954,857, and 4,972,649 among others.

A problem confronted in the assembly of prewind cameras is that the unexposed filmstrip roll must be preloaded into an open side of the film roll chamber and then the camera body must be made lighttight, such as by the attachment of a rear cover which covers the open side of the film roll chamber. Simply releasing the film roll once loaded in the chamber, however, causes clockspringing, an expansion or detensioning of the film roll which must be prevented prior to the assembly of the rear lighttight cover to the camera body.

Numerous attempts have been made to solve the problem of clockspringing. In one such attempt, the mouth of the film roll chamber is made smaller than the cavity portion of the chamber. Other attempts require the use of additional supporting parts which must be added to force constraining of the film roll at least until the cover can be assembled to the rear of the film roll chamber.

SUMMARY OF THE INVENTION

The present invention is directed to overcoming one or more of the problems set forth above. Briefly summarized, according to one aspect of the present invention, there is provided a method of assembling a prewind camera comprising the steps of:

placing a prewound film roll into an open portion of a film roll chamber of the camera body;

applying a vacuum to the interior of the film roll chamber to maintain the film roll in a tensioned state; and attaching a lighttight cover to the open portion of the film roll chamber.

According to another aspect of the present invention, there is provided apparatus for assembling a prewind camera having a film roll chamber for containing an unexposed roll of film, characterized by:

vacuum means for applying a vacuum to the interior of the film roll chamber to maintain the film roll in a tensioned state during assembly of the camera.

An advantage achieved by the present invention is that by applying a vacuum as described to the interior of the film roll chamber, a wound roll of film can be maintained in a tensioned or wound state without clockspringing, easing the assembly process.

A further advantage of the present invention is that the film roll chamber can be formed with closed ends, and does not require the forming of the film roll inside the camera body.

These and other aspects, objects, features and advantages of the present invention will be more clearly understood and appreciated from a review of the following Detailed Description of the Preferred Embodiments and appended claims, and by reference to the accompanying drawings.

DETAILED DESCRIPTION OF THE INVENTION

Figure 1:
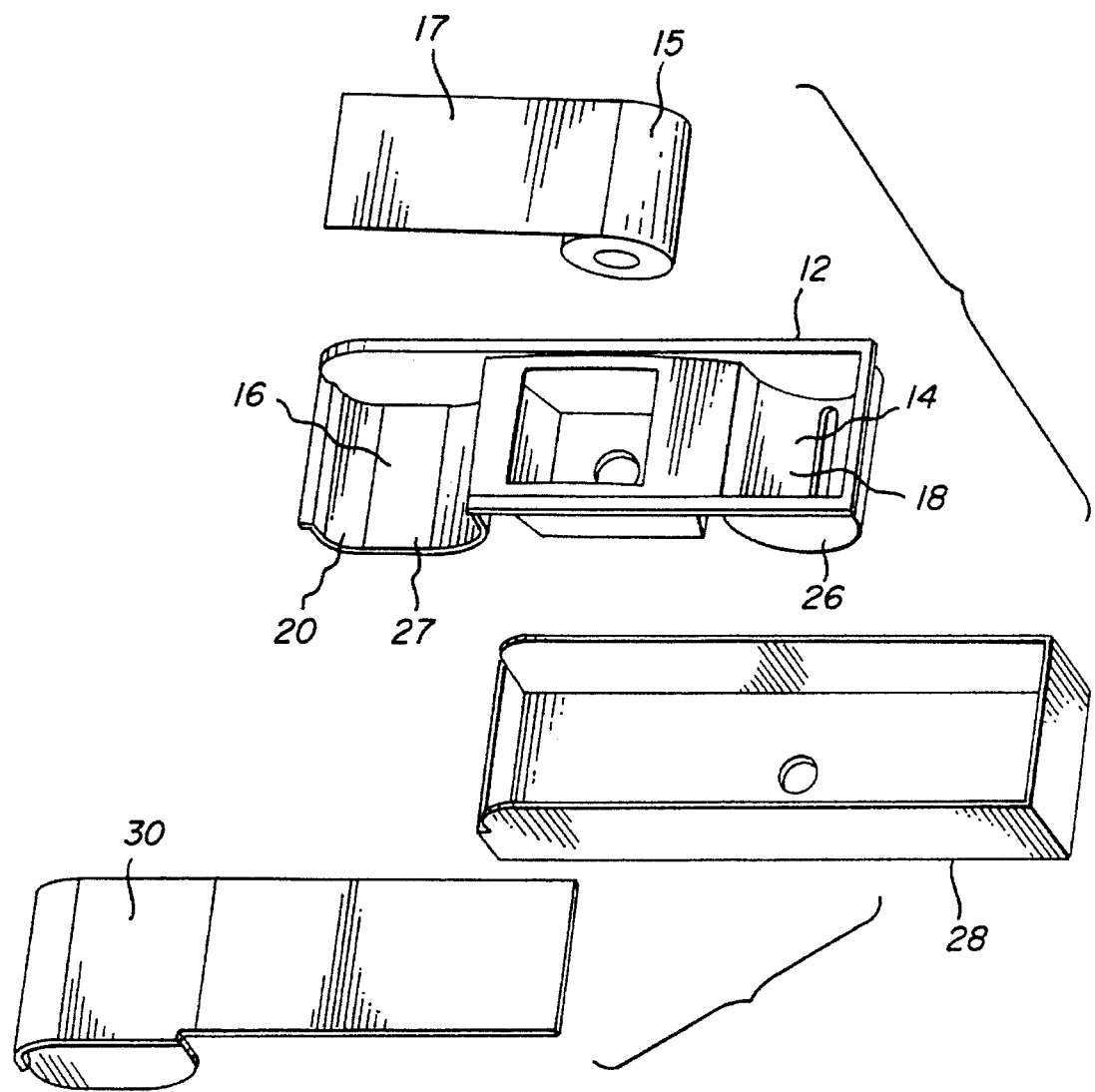
FIG. 1 is an exploded rear perspective view of a prewinding-type camera useful in a first embodiment of the present invention.

The following description refers to a preferred embodiment according to the present invention. Referring to the drawings in general and particularly to FIGS. 1 and 2, a single use camera 10 includes a body or frame 12 which is a unitary plastic injection molded component including a pair of chambers 14, 16 for retaining a film roll 15 and a film cartridge 62, shown only in FIG. 7, respectively. The film cartridge 62, FIG. 7, according to this embodiment is of the thrusting-type and is commonly known and described, such as by U.S. Pat. Nos. 5,031,852 and 5,347,334, among others. The type of film cartridge, however, or the use of a film cartridge at all, is not critical to the concepts embodied by the invention, as will be apparent from the following discussion.

Figure 7:
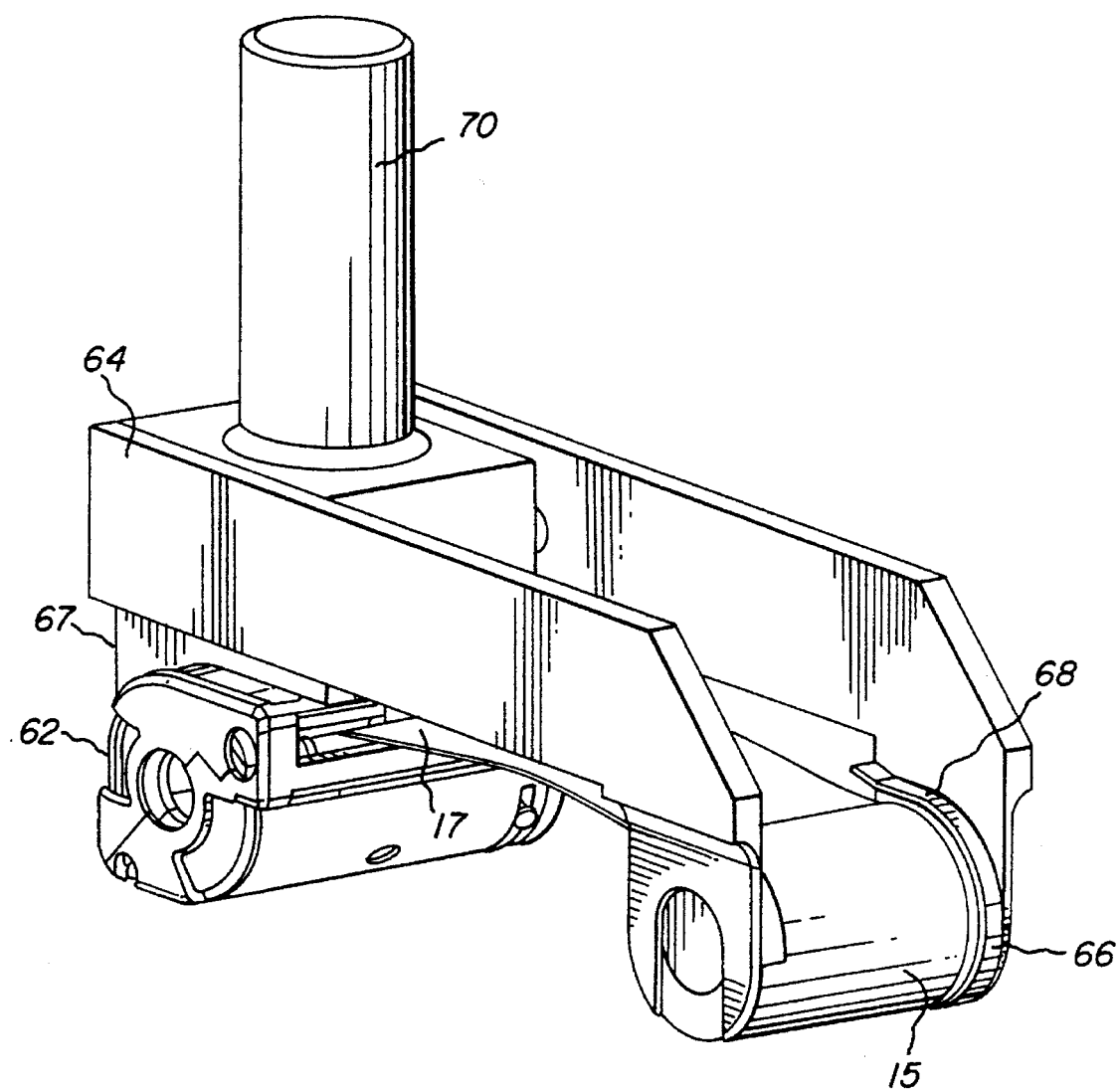
FIG. 7 is a partial perspective view of tooling used to transport a film roll to the film roll chamber of a to be assembled camera.

Each of the chambers 14, 16 include an open side 22, 24 to allow insertion of the film roll 15 and the film cartridge 62, FIG. 7, and are defined by interior cavities having cylindrical inner walls 18, 20. The film roll chamber 14 according to this embodiment is further defined by a pair of closed ends 26, while the film cartridge chamber 16 includes an open end 27.

Figure 4:
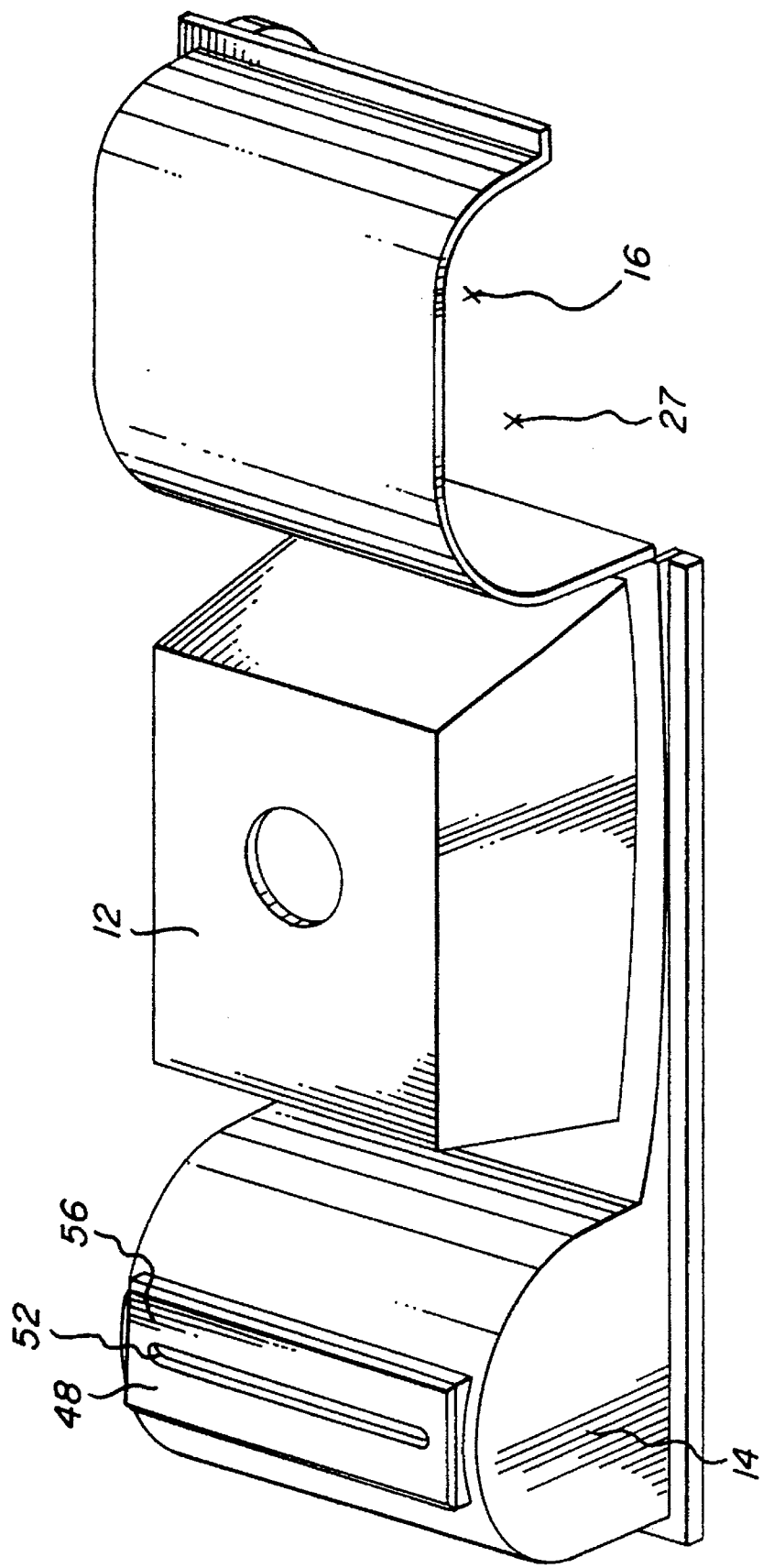
FIG. 4 is a front perspective view of the front of the camera frame, showing a modification to allow vacuum attachment.
Figure 5:
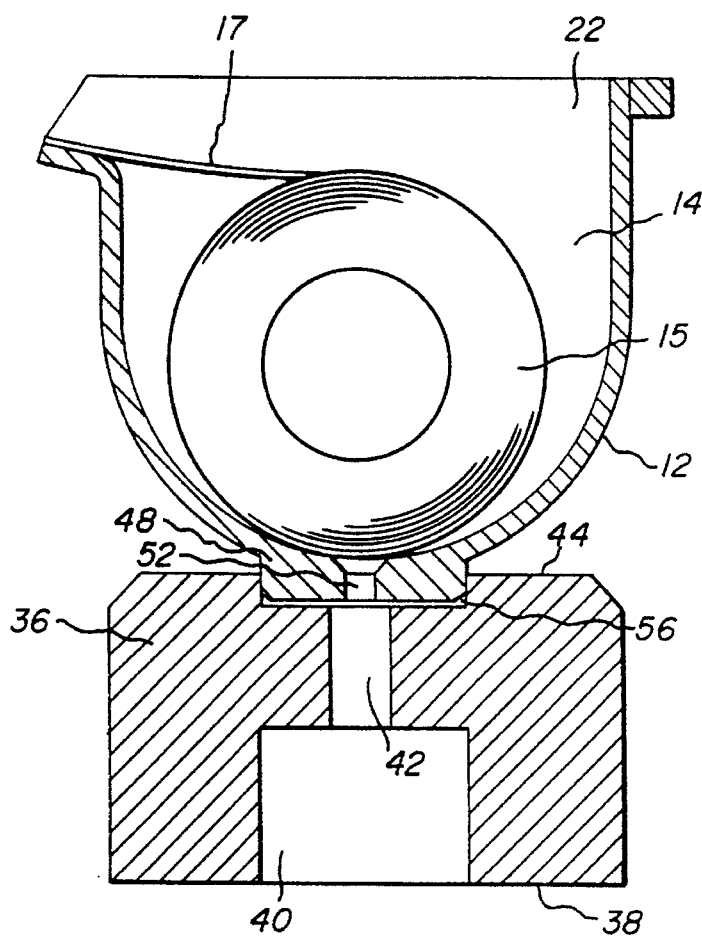
FIG. 5 is a partial cross sectional view of the film roll chamber of the camera shown in FIGS. 1–4 showing the vacuum engagement with a loaded film roll.
Figure 6:
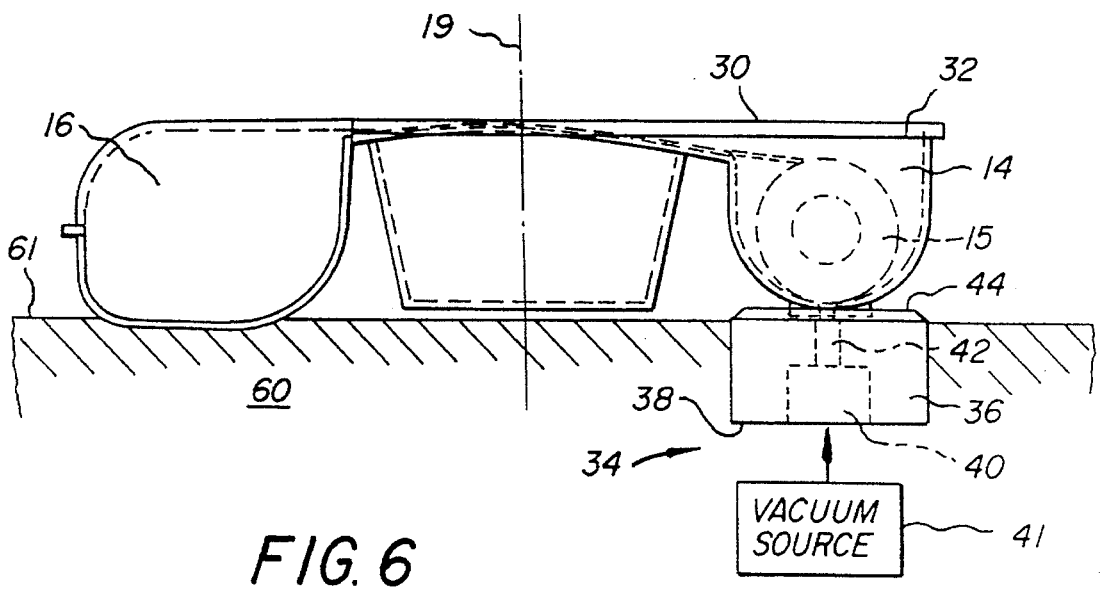
FIG. 6 is a sectional view of the camera shown in FIGS. 1–5, showing the vacuum hold down during the assembly of the rear cover to the camera body according to the preferred embodiment.

Referring most specifically to FIG. 4, the front of the camera frame 12 according to this embodiment includes a front mating portion 48 for fitting to or engaging a vacuum apparatus 34, shown in FIGS. 5 and 6. The front mating portion 48 protrudes from the exterior of the frame periphery forming the outer wall of the film roll chamber 14 and includes a engaging surface 56 having a longitudinal slot 52 which extends into the interior of the film roll chamber 14. According to this embodiment, the mating portion 48 is a molded extension of the front of the frame 12, though alternately the mating portion may be releasably attached by known means to the front of the frame for removal after the assembly process has been completed and prior to the assembly of a front cover 28, FIG. 1.

Figure 2:
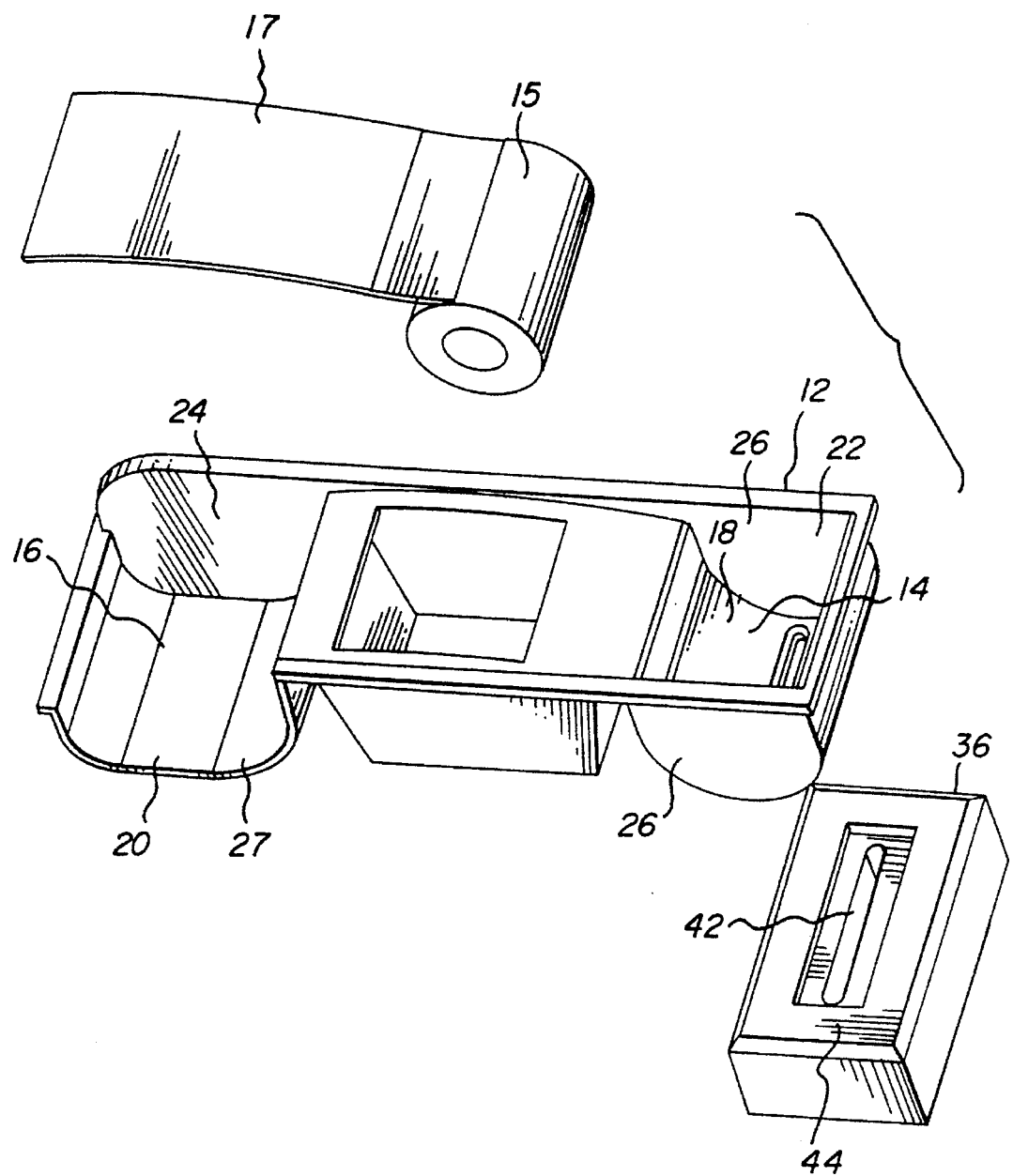
FIG. 2 is a partial rear exploded view of the camera shown in FIG. 1, showing a vacuum block made in accordance with a preferred embodiment.
Figure 3:
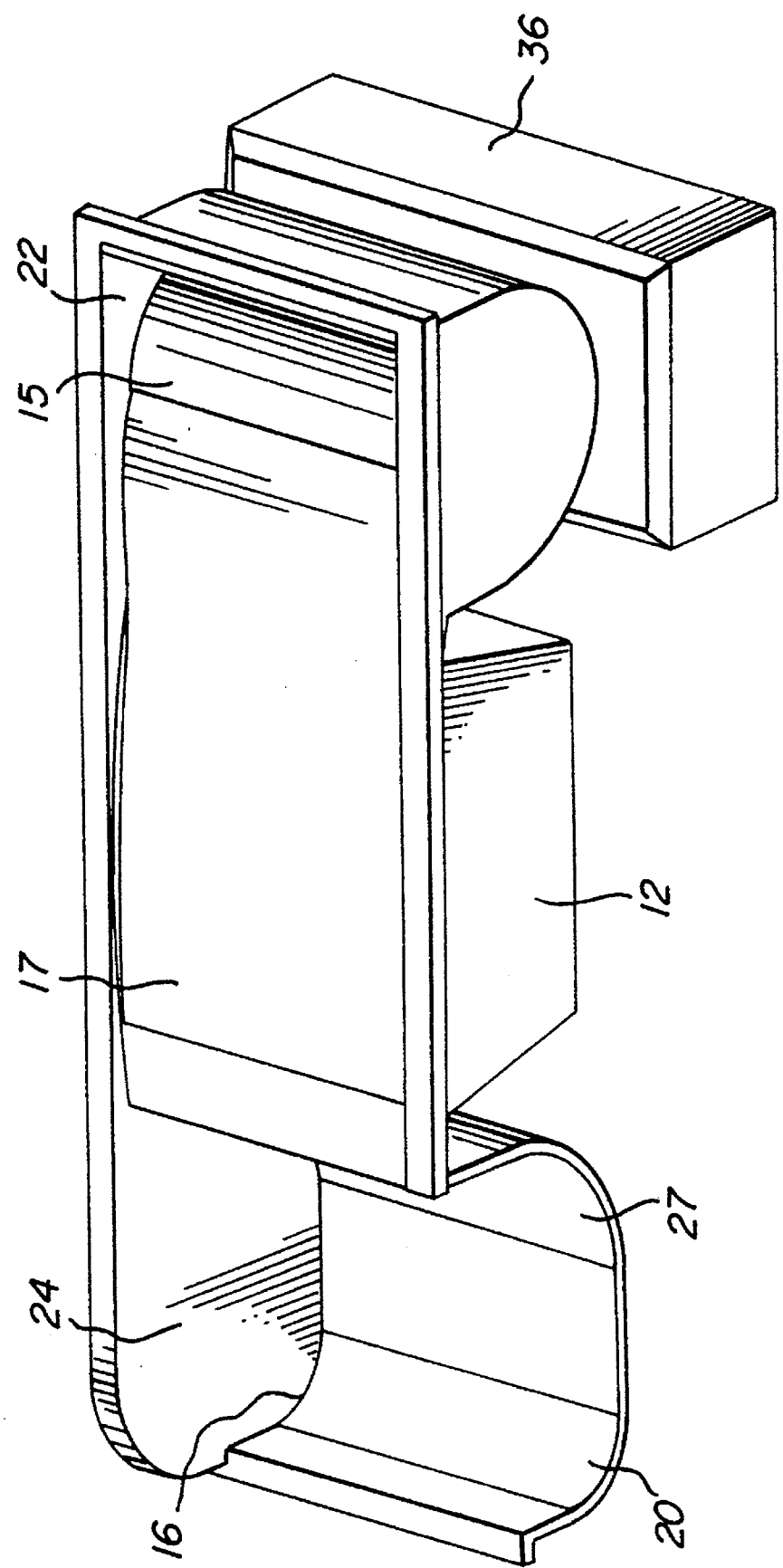
FIG. 3 is a rear perspective view of a partially assembled camera having an inserted film roll prior to the assembly of a lighttight rear cover.

Referring most particularly to FIG. 2 and the sectional views of FIGS. 5 and 6, the vacuum apparatus 34, FIG. 6, includes a block-like element 36 which can be mounted within a recess (not shown) of an assembly table 60, or the like. A vacuum supply engagement fitting 40 extends into the block interior from a bottom surface 38. An extending slot 42 is provided from the engagement fitting 40 which corresponds in length to the longitudinal slot 52 of the front mating section 48. The block element 36 is recessed from a top surface 44 to the slot 42 for engaging the front mating portion 48 of the frame 12. Preferably, each of the slots 42, 52 are chamfered to prevent sharp edges and to control the flow of vacuum into the interior of the film roll chamber 14.

Generally referring to the figures and in operation, a film roll 15 or scroll is first created outside the camera frame 12 according to this embodiment and in a darkroom by known apparatus which extracts the film from the confines of a film cartridge 62, shown in FIG. 7, to create a film roll. Such a scrolling operation is commonly known and is described in U.S. Pat. No. 4,972,649.

Alternately, however, the film roll 15 can also be created from a film stock roll or other source (not shown), after creating leading and trailing ends (not shown) for the film roll and then winding the film onto an extractable winding member (not shown). The winding member (not shown) is removed after the film roll has been created and the trailing end 17 of the cylindrical film roll 15 can subsequently be attached by known means to the film spool (not shown) of a film cartridge 62. Such a prewinding operation is described more fully in copending and commonly assigned U.S. Ser. No. 08/607,844, filed Feb. 27, 1996, the contents of which are hereby incorporated by reference in their entirety.

As noted above, it should be readily apparent that the trailing end 17 of the film roll 15 need not be limited for attachment to the film spool of a lighttight film cartridge 62. For example, the trailing end of the film roll could alternately be attached to a winding member or film take-up spool which does not have a lighttight enclosure. Other such configurations can be easily imagined using the present concept described herein.

The film roll 15 is then transported to the camera frame 12 for insertion into the film roll chamber 14 through the open side 22. According to this embodiment, this process can take place by manually applying inwardly directed pressure against each end of the cylindrical film roll 15. The film roll 15 can then be inserted into the open side 22 of the film roll chamber 14, orienting the film roll so that the trailing end 17 remains adjacent the open side at the closest position relative to the centerline 19, FIG. 6, of the camera 10.

Alternately, and depending on the configuration of the camera frame 12 and particularly the film roll chamber 14, production or automated tooling can be used for attaching to the film roll 15 and for transporting and lowering the film roll in a predetermined manner into the cavity of the film roll chamber 14. An example of such a transporting apparatus 64 is shown in FIG. 7, which is particularly suitable for a camera frame in which the film roll chamber has an open end in addition to the open side. This apparatus 64 handles the film roll 15 and the film cartridge 62 on separate retaining portions 66, 67 in which the film roll is sandwiched between a pair of arcuate film roll handling members 68, each configured to prevent film roll clockspringing while supporting the film roll. The apparatus 64 is made movable by means of an articulating robotic arm 70. Additional details regarding the operation and use of this tooling is described in U.S. Ser. No. 08/607,844, filed Feb. 27, 1996, which was previously incorporated by reference.

The camera frame 12 is mounted in a darkroom according to this embodiment to an assembly table 60 having means for mounting thereto the vacuum apparatus 34. The camera frame 12 is positioned with the front side of the frame facing the top surface 61 of the table 60 and the front mating portion 48 aligned with the block element 36, as shown in FIG. 6. By providing a recess from the top surface 44 of the block member 36 for accommodating the front mating portion 48, an effective seal is made for the application of vacuum through the slots 42, 52.

Either prior to insertion of the film roll 15 into the film roll chamber 14, or at least prior to releasing the inward pressure on the ends of the film roll as in the embodiment described, a vacuum is applied by the vacuum apparatus 34 through a vacuum hose or other conventionally known vacuum source 41 attached to the engagement fitting 40 of the block element 36 through slots 42, 52, respectively, into the film roll chamber 14 which pulls the outermost convolution of the film roll 15 into contact with the cylindrical inner wall 18 of the film roll chamber. According to this embodiment, a pressure of 20 inches of Hg (500 mm) is adequate to prevent the film roll 15 from expanding to a larger diameter once the ends of the film roll 15 are released. That is, the applied vacuum is adequate to counteract the inherent spring force induced in the creation of the film roll 15 due to the constraint provided by the vacuum force applied by the source 41 against the outermost convolution of the film against the interior of the chamber 14.

The vacuum is preferably maintained until the rear cover 30 is attached by known means to cover the open side 22 of the film roll chamber 14, as well as the open side 24 and open end 27 of the film cartridge chamber 16. Once the cover 30 is attached to the rear of the camera frame 12, the inner surface 32 of the cover provides sufficient force against the outermost convolution of the cylindrical film roll 15, and the application of vacuum is no longer required.

The camera frame 12 can then be removed from the assembly table 60, and particularly the block element 36 for further assembly. It is preferable that the longitudinal slot 52 of the front mating portion 48 be covered either by the front cover 28 or other light blocking means (not shown) to preserve the lighttight integrity of the camera 10 prior to relocating the assembly in a lighted environment.

It should be readily apparent from the preceding discussion that other means can be utilized for applying a vacuum to the film roll chamber; for example, other slotting configurations can be used. In addition, the vacuum can be applied to the interior of the film roll chamber 14 other than through the front of the camera frame 12 provided that sufficient negative pressure is applied to the outermost convolution of the film roll 15. It should also be readily apparent that the specific configuration of the camera frame chambers containing the film roll should not be limited provided a contact surface is provided to retain the outermost convolution of film of the loaded film roll.

The invention has been described with reference to a preferred embodiment. However, it will be appreciated that variations and modifications can be effected by a person of ordinary skill in the art without departing from the scope of the invention.

PARTS LIST FOR FIGS. 1–7

| | | |
|---|---|---|
| 12 | camera frame | |
| 14 | film roll chamber | |
| 15 | film roll | |
| 16 | film cartridge chamber | |
| 17 | trailing end | |
| 18 | cylindrical inner wall | |
| 19 | centerline | |
| 20 | cylindrical inner wall | |
| 22 | open side | |
| 24 | open side | |
| 26 | closed ends | |
| 27 | open end | |
| 28 | front cover | |
| 30 | rear cover | |
| 32 | inner surface | |
| 34 | vacuum apparatus | |
| 36 | block element | |
| 38 | bottom surface | |
| 40 | vacuum supply engagement fitting | |
| 41 | vacuum source | |
| 42 | slot | |
| 44 | top surface | |
| 46 | recess | |
| 48 | front mating portion of frame | |
| 52 | longitudinal slot | |
| 56 | engaging surface | |
| 60 | assembly table | |
| 61 | top surface | |
| 62 | film cartridge | |
| 64 | film roll transport apparatus | |
| 66 | retaining portion | |
| 67 | retaining portion | |
| 68 | film roll holding members | |
| 70 | articulating arm | |

We claim:

1. A method of assembling a prewind camera having a camera body having a film roll chamber with an open portion for containing an unexposed roll of film in which an unexposed film roll is sequentially advanced into a film cartridge contained in an adjacent chamber of said camera, comprising the steps of:

prewinding an unexposed film roll from the film cartridge;

placing the unexposed film roll into the open portion of the film roll chamber;

applying a vacuum to the interior of the film roll chamber to constrain the film roll in a tensioned state; and fixing a rear cover to the rear of the film roll chamber to make the camera lighttight.

2. A method of loading a prewind type camera having a frame including a film roll chamber having an open portion for containing an unexposed filmstrip roll, comprising the steps of:

loading the unexposed filmstrip roll into the film roll chamber;

applying a vacuum to the interior of the film roll chamber to maintain the film roll in a tensioned state; and fixedly attaching a lighttight cover over the open portion of said film roll chamber.

3. A method according to claim 2, wherein said vacuum is applied to the interior of the film roll chamber immediately prior to the loading step.

4. A method according to claim 2, wherein the vacuum is discontinued after the lighttight cover has been fixedly attached.

5. A method according to claim 2, wherein said camera is assembled in a darkroom prior to the attachment of said lighttight cover.

6. Apparatus for loading an unexposed filmstrip roll into a prewind type camera comprising a frame including a film roll chamber for containing a wound unexposed roll of film and having an open portion, and a cover for lighttightly covering said open portion, is characterized by:

vacuum means for applying vacuum pressure to the interior of the film roll chamber to constrain the film roll in a wound state in said chamber prior to the assembly of the lighttight cover.

7. Apparatus according to claim 6, including a vacuum apparatus attachable to said frame for applying a vacuum to the interior of the film roll chamber, said chamber including a slotted portion for engaging said vacuum apparatus.

* * * * *

IN THE UNITED STATES PATENT AND TRADEMARK OFFICE
CERTIFICATE OF CORRECTION

PATENT NO.:     5,608,482
DATED:          March 4, 1997
INVENTOR(S):    Joseph A. Watkins, et al It is certified that an error appears in the above-identified patent and that said Letters Patent is hereby corrected as shown below:

Title page,
Item [57] Abstract     -- Line 2, Delete "cheer" and insert --chamber-- --
Item [57] Abstract     -- Line 4, Delete "cheer" and insert --chamber-- --
Item [57] Abstract     -- Line 5, Delete "cheer" and insert --chamber-- --

Signed and Sealed this

Sixteenth Day of December, 1997

Attest:

BRUCE LEHMAN

*Attesting Officer*            *Commissioner of Patents and Trademarks*